United States Patent
Brault et al.

(10) Patent No.: US 11,271,230 B2
(45) Date of Patent: Mar. 8, 2022

(54) METHOD FOR ELECTRICAL SUPPLY OF AN APPARATUS BY AN AUTONOMOUS HYBRID STATION

(71) Applicants: CENTRE NATIONAL DE LA RECHERCHE SCIENTIFIQUE (CNRS), Paris (FR); UNIVERSITE D'ORLEANS, Orleans (FR)

(72) Inventors: Pascal Brault, Saint Denis en Val (FR); Cédric Grolleau, Saint Anne (FR); Samuel Rouxel, Le Bardon (FR); Serge Gasnier, Orleans (FR); Amael Caillard, Cléry Saint André (FR); Thomas Lecas, Saint Denis de l'Hotel (FR)

(73) Assignees: CENTRE NATIONAL DE LA RECHERCHE SCIENTIFIQUE, Paris (FR); UNIVERSITÉ D'OrlÉANS, Orléans (FR)

( * ) Notice: Subject to any disclaimer, the term of this patent is extended or adjusted under 35 U.S.C. 154(b) by 349 days.

(21) Appl. No.: 16/305,666

(22) PCT Filed: May 30, 2017

(86) PCT No.: PCT/FR2017/051338
§ 371 (c)(1),
(2) Date: Nov. 29, 2018

(87) PCT Pub. No.: WO2017/207910
PCT Pub. Date: Dec. 7, 2017

(65) Prior Publication Data
US 2020/0328440 A1    Oct. 15, 2020

(30) Foreign Application Priority Data

May 30, 2016  (FR) ...................... 1654835

(51) Int. Cl.
*H01M 8/04537*  (2016.01)
*H01M 8/04955*  (2016.01)
(Continued)

(52) U.S. Cl.
CPC ... *H01M 8/04604* (2013.01); *H01M 8/04955* (2013.01); *H01M 16/006* (2013.01); *H02J 1/10* (2013.01)

(58) Field of Classification Search
CPC ........ H01M 8/04604; H01M 8/04955; H01M 16/006; H01M 16/003; H01M 8/04537;
(Continued)

(56) References Cited

U.S. PATENT DOCUMENTS

| 9,692,235 B2 * | 6/2017 | Munier ..................... H02J 4/00 |
| 2007/0042245 A1 * | 2/2007 | Nakamura ........ H01M 8/04753 429/430 |

(Continued)

FOREIGN PATENT DOCUMENTS

| EP | 0 136 187 A2 | 4/1985 |
| EP | 2 048 759 A1 | 4/2009 |

(Continued)

OTHER PUBLICATIONS

International Search Report, dated Sep. 11, 2017, from corresponding PCT application No. PCT/FR2017/051338.

*Primary Examiner* — Bach T Dinh
(74) *Attorney, Agent, or Firm* — Nixon & Vanderhye

(57) ABSTRACT

Disclosed is a method for electrical supply of an apparatus by a system including an intermittent electrical source, electrical storage unit, a fuel cell, and an electrochemical unit for generating the fuel. The method includes steps of: determining a power balance of the system depending on the power consumed by the apparatus and supplied by the intermittent electrical source; receiving data representative (Continued)

Figure 1:
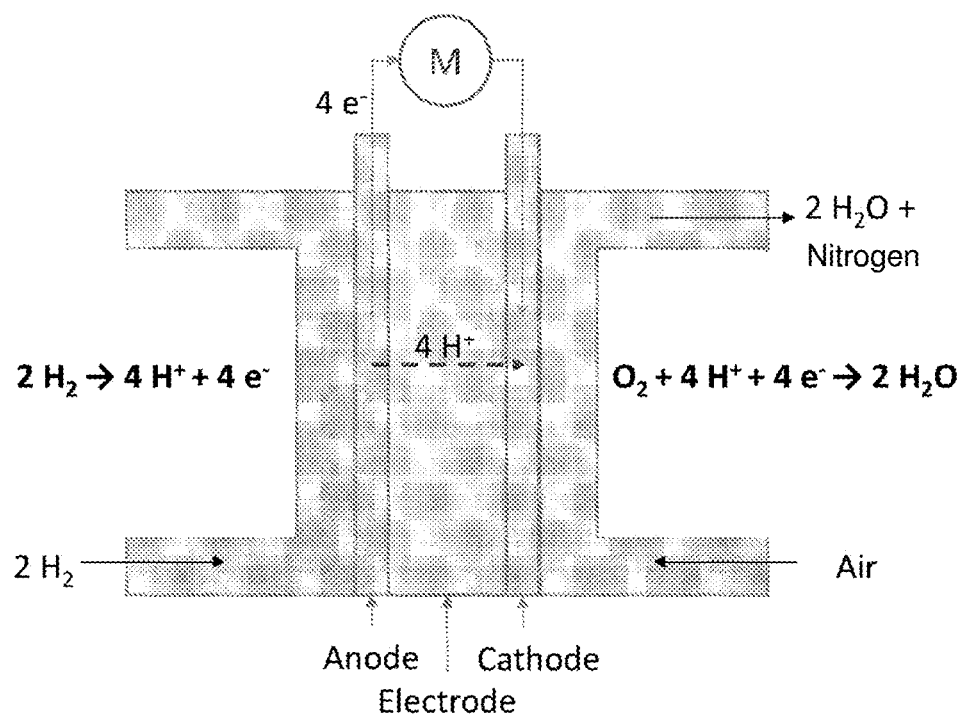

of the stability of the power balance during a safety period; controlling the fuel cell and the electrochemical unit: to activate the electrochemical unit if the power balance is greater than a first threshold and the data are not characteristic of a subsequent decrease in the power balance; activating the fuel cell if the power balance is less than a second threshold, which is less than the first threshold, and the data are not characteristic of a subsequent increase in the power balance.

15 Claims, 2 Drawing Sheets

(51) Int. Cl.
  *H01M 16/00* (2006.01)
  *H02J 1/10* (2006.01)

(58) Field of Classification Search
  CPC .......... H02J 1/10; H02J 3/381; H02J 2300/24; H02J 2300/20; H02J 2300/28; H02J 3/387; H02J 3/382; H02J 3/32; H02J 3/28; H02J 3/383; H02J 3/386; H02J 15/00; H02J 2300/30; Y02E 60/10; Y02E 60/50; Y02E 10/56; Y02E 70/30
  See application file for complete search history.

(56) References Cited

U.S. PATENT DOCUMENTS

| | | |
|---|---|---|
| 2011/0040421 A1 | 2/2011 | Duret et al. |
| 2012/0232706 A1* | 9/2012 | Hayashida ................ H02J 3/14 700/282 |
| 2014/0324243 A1* | 10/2014 | Markowz .................. H02J 3/32 700/297 |
| 2015/0333350 A1 | 11/2015 | Toya et al. |
| 2019/0067945 A1* | 2/2019 | Hierl ................... H01M 16/006 |

FOREIGN PATENT DOCUMENTS

| | | |
|---|---|---|
| EP | 2 686 934 A1 | 1/2014 |
| EP | 2 953 198 A1 | 12/2015 |
| EP | 2 686 934 B1 | 11/2016 |
| FR | 2 972 867 A1 | 9/2012 |
| WO | 2012/123350 A1 | 9/2012 |

\* cited by examiner

METHOD FOR ELECTRICAL SUPPLY OF AN APPARATUS BY AN AUTONOMOUS HYBRID STATION

GENERAL TECHNICAL FIELD

The present invention relates to the field of so-called autonomous hybrid stations combining at least one intermittent electrical source, at least one electrochemical unit for generating chemical fuel, at least one fuel cell and electrical storage means.

More precisely, the invention relates to a method of controlling such an autonomous station.

STATE OF THE ART

In a context of strong development of Renewable Energies, the need for flexibility of electrical installations has grown.

These renewable energies, represented basically by wind and solar power, do not in fact enable a constant and regular production, unlike a nuclear power plant, and this gives rise to problems of the variability and predictability of the associated production. This results in a sharp increase in very short-term risks.

For this reason, it is known to couple a renewable energy source with electrical storage means such as batteries and, if appropriate, an auxiliary source such as an electric generator to compensate for moments when neither the battery nor the renewable source are capable of providing enough current for the use for which they are intended.

These systems form autonomous stations, sometimes suitable for easy transportation (mounted on wheels, for example) that can be deployed, for example, so as reliably to power remote areas.

In particular, it has been proposed to use a fuel cell as an electricity-generating source and to add to the station an electrochemical unit generating the fuel for said cell. Such stations are called autonomous hybrid stations.

A fuel cell is an electrical generator in which the oxidation of a reducer fuel (such as dihydrogen) is performed on one electrode coupled with the reduction on the other electrode of an oxidant (such as the dioxygen in air).

Thus, the operation of a fuel cell (an example of which is shown in FIG. 1) is governed in the case of dihydrogen by the following redox reactions:

At the anode: 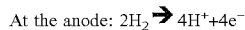

At the cathode: 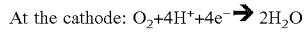

The flow of electrons produced at the anode can thus supply an electrical charge before being re-routed to the cathode.

The associated chemical unit generating the fuel is typically an electrolyzer that "forces" reverse redox reactions under the effect of a current. The principle of electrolysis can be summarized by the following equation: $2\ H_2O + \text{electricity} \rightarrow 2\ H_2 + O_2$. Note that other "reversible" fuel cells exist that are capable of consuming or producing current (and thus of producing or consuming dihydrogen respectively) as required.

Thus, dihydrogen (or another chemical fuel) can be used as a chemical storage means of electrical energy. It is produced or consumed in order to adapt the electrical production of the station to the requirements and levels of power of the intermittent source and of the battery.

Application FR2972867 proposes in this regard a method for managing the energy in such an autonomous station where hydrogen is generated only if the battery is charged, with priority given to use of the battery in the event of demand, the fuel cell being used only if the battery reaches its deep-discharge threshold. In other words, the battery is used when its available power is between a high threshold and a low threshold, the electrolyzer or fuel cell being used only if the battery is above the high threshold or below the low threshold respectively.

This solution is satisfactory and optimizes the overall efficiency of the system.

However, it is recognized that it is likely to cause premature ageing of the fuel cell or electrolyzer. In fact, these devices (and electrochemical elements in general) are suitable for slow operating cycles and undergo "surges" that damage them if there is too little time between being switched on and switched off, and vice versa.

It would consequently be desirable to have a management method that is equally optimized but that also takes care of the electrochemical devices and extends their lifetime.

PRESENTATION OF THE INVENTION

According to a first aspect, the invention proposes to overcome these drawbacks via a method for electrical supply of an apparatus by a system comprising an intermittent electrical source, electrical storage means, a fuel cell and an electrochemical unit for generating said fuel, characterized in that it comprises the implementation of steps by a control module, steps of:
   a) determining a power balance of the system depending on the power consumed by the apparatus and the power supplied by the intermittent electrical source;
   b) receiving data representative of the stability of said power balance during a safety period;
   c) controlling the fuel cell and the electrochemical unit in such a way as:
      to activate the electrochemical unit if said power balance is greater than a first threshold and said data are not characteristic of a subsequent decrease in said power balance;
      to activate the fuel cell if said power balance is less than a second threshold less than the first threshold and said data are not characteristic of a subsequent increase in said power balance.

The device according to the invention is advantageously completed by the following characteristics, taken alone or in any one of their technically possible combinations:
   the step (c) involves controlling the fuel cell so as to activate the fuel cell even if said power balance is less than a second threshold less than the first threshold and said data are characteristic of a subsequent increase in said power balance; if a quantity of energy stored by the electrical storage means is insufficient to supply the apparatus during said safety period;
   the step (c) involves controlling the fuel cell so as to deactivate the fuel cell if said power balance is greater than the second threshold and said data are not characteristic of a subsequent decrease in said power balance;
   step (c) involves controlling the electrochemical unit so as to deactivate the electrochemical unit if said power balance is less than the first threshold and said data are not characteristic of a subsequent increase in said power balance;

step (c) involves controlling the electrochemical unit so as to deactivate the electrochemical unit if said power balance is less than the first threshold and said data are not characteristic of a subsequent increase in said power balance; if a quantity of energy stored by the electrical storage means is insufficient to supply the apparatus and the electrochemical unit during said safety period;

said safety period is a minimum recommended duration of continuous operation of the fuel cell or of the electrochemical unit in order to prevent them from being damaged;

said safety period is between one and ten minutes;

the electrochemical unit consists of at least one electrolyzer;

the electrochemical unit and the fuel cell are a single reversible apparatus;

said fuel is dihydrogen;

the electrical storage means consist of at least one battery and/or at least one supercapacitor and/or at least one flywheel;

the first power balance threshold corresponds substantially to the power required for the operation of the electrochemical unit, and the second power balance threshold is substantially zero.

According to a second aspect, the invention relates to a system comprising an intermittent electrical source, electrical storage means, a fuel cell, an electrochemical unit for generating said fuel and a control module, configured to implement:

a module for determining a power balance of the system depending on the power consumed by an apparatus supplied by the system and the power provided by the intermittent electrical source;

a module for receiving data representative of the stability of said power balance during a safety period;

a module for activating the electrochemical unit if said power balance is greater than a first threshold and said data are not characteristic of a subsequent decrease in said power balance;

a module for activating the fuel cell if said power balance is less than a second threshold less than the first threshold and said data are not characteristic of a subsequent increase in said power balance.

PRESENTATION OF THE FIGURES

Figure 2:
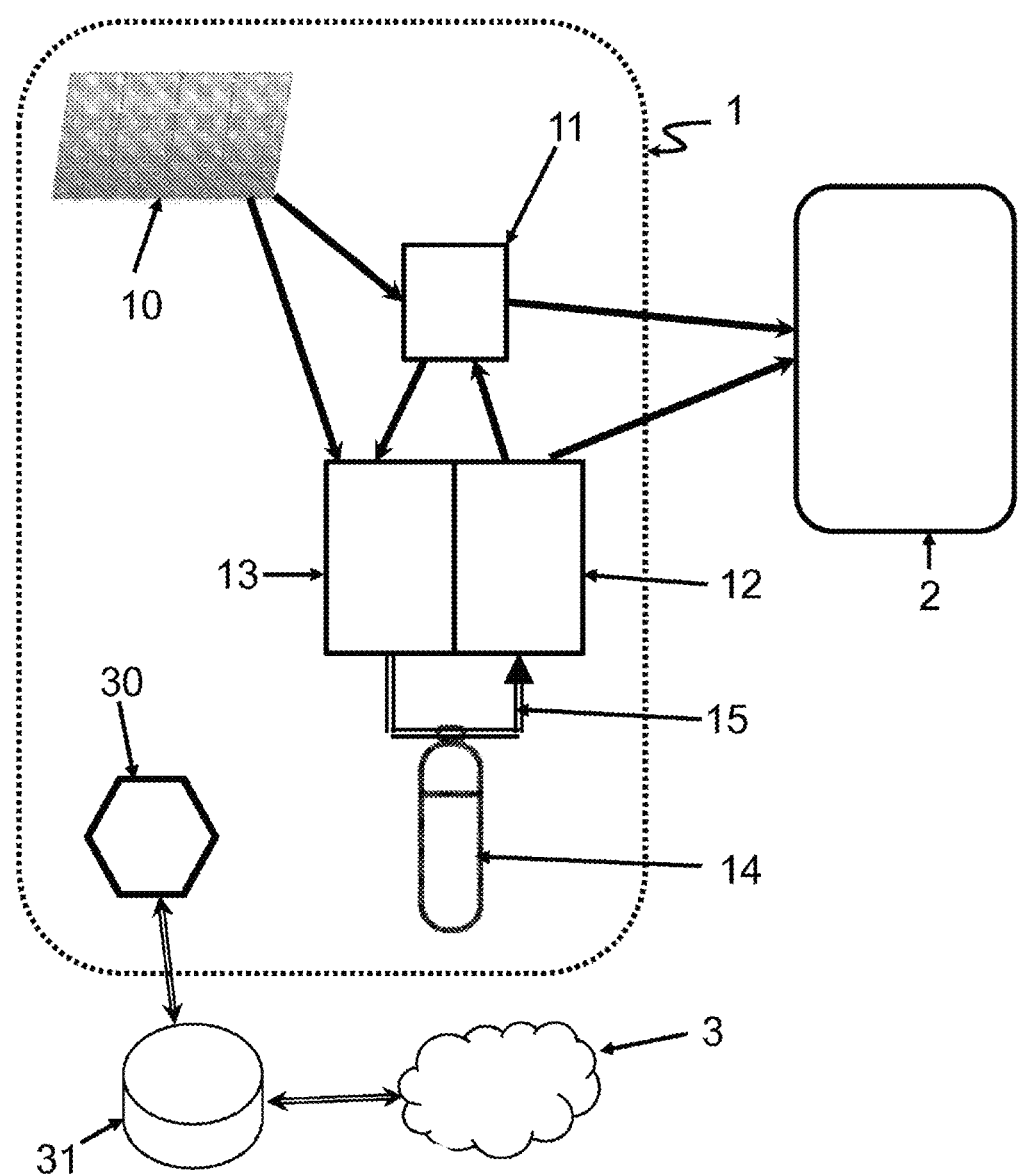

Further features, objects and advantages of the invention will emerge from the following description, which is given purely by way of non-limiting illustrative example and which must be read in conjunction with the accompanying drawings, in which:

FIG. 1, previously described, is a diagram of a known hydrogen fuel cell;

FIG. 2 represents a system for implementing the method for supplying an apparatus according to the invention.

DETAILED DESCRIPTION

General Architecture

FIG. 2 represents a preferred embodiment of a system 1 for implementing the present method for supplying an apparatus 2.

The apparatus 2 can be any device or assembly of a device that consumes electricity. At any time, the apparatus 2 consumes a consumed power $P_C(t)$ that can be variable and, at certain times, zero.

The system 1 is an autonomous station as previously described, consisting of two main assemblies: an "electrical" assembly and a "chemical" assembly.

The electrical assembly comprises an intermittent electrical source 10 and an electrical storage means 11, as well as any additional electrical components (transformers, electrical protection systems, etc.).

The intermittent electrical source 10 is advantageously supplied by one or more renewable energy sources, i.e. the electrical source advantageously consists of one or more electrical generators supplied by renewable energies. Preferably, the intermittent electrical source 10 thus comprises one or more photovoltaic panels and/or one or more wind turbines.

"Intermittence" means that the source 10 supplies a variable power $P_F(t)$, dependent on external physical phenomena (sun, wind, temperature, etc.) that cannot therefore be controlled. In other words, the source 10 consumes no fuel, and it will be clearly understood that an apparatus of the fuel cell 12 type that will be described later (which consumes a chemical fuel) is not an intermittent electrical source 10 in the context of the present invention.

The electrical storage means 11 serve generally as a "buffer" between the system 1 and the apparatus 2. More precisely, they store and release electricity so as to smooth the variation in power of the intermittent source 10. They are connected electrically to each of the other components 10, 12, 13 of the system 1. The electrical storage means 11 advantageously consist of at least one battery and/or at least one supercapacitor and/or at least one flywheel.

On the other side, the chemical assembly comprises at least one fuel cell 12 and at least one electrochemical unit for generating said fuel 13. These two are respectively capable of producing electricity by consuming a chemical fuel, and of producing said chemical fuel by consuming electricity. Each fuel cell 12 and each electrochemical unit 13 can comprise several cells performing the chemical reaction.

Preferably (and this example will be used later in the present description), said chemical fuel is gaseous dihydrogen, but a person skilled in the art will know how to use other fuels for which compatible fuel cells exist, such as methanol, formic acid or boron hydride, etc.

As explained, the fuel cell 12 is an electrical generator in which said chemical fuel is oxidized on one electrode while an oxidizing fuel, particularly atmospheric dioxygen, is reduced on the other electrode. In the case of dihydrogen, as explained, the product of the reaction is water.

A fuel cell does not implement combustion, which allows it to achieve very high levels of performance. Numerous fuel cell technologies exist, particularly hydrogen cell technology, and a person skilled in the art will be able for example to use a Proton Exchange Membrane (PEM) fuel cell, or solid oxide cell.

The electrochemical unit for generating said fuel 13 is the component having the opposite role to the fuel cell 12: it consumes electricity to generate said chemical fuel. If the latter is dihydrogen, the unit 13 produces it from water, which is found naturally in large quantities, typically by electrolysis, in other words by performing chemical reactions thanks to a difference in electrical potential.

Later in the present description, the example of a unit 13 of the electrolyzer type will be taken, but a person skilled in the art will know how to produce chemical fuel in other ways, for example by thermolysis.

In the case of at least one electrolyzer, different technologies may be involved, in particular proton exchange membrane technology. Such a technology advantageously allows the electrochemical unit 13 and the fuel cell 12 to be a single reversible apparatus. In other words, this reversible apparatus produces dihydrogen if it is supplied with current and produces current if it is provided with dihydrogen. This greatly simplifies the structure of the system 1 and greatly limits its size.

Alternatively, a high-temperature electrolyzer can for example be used (suitable for performing an electrolysis of water vapor at a temperature of around 800° C.), which gives an even better performance.

Preferably, the "chemical" assembly also comprises "auxiliaries," i.e. means for storing dihydrogen 14 (high-pressure bottles), if necessary a compressor, and a dihydrogen circuit 15 (to transfer the latter from the unit 13 to the cell 12 and/or to the storage means 14). In the case of a single apparatus of production and consumption, the circuit 15 connects this apparatus 12, 13, and the bottles 15, the dihydrogen going back and forth).

Clearly, there may be several units 13 and/or several cells 12, each if necessary with several cell units, depending on the size of the system 1. The present description will take the example of one unit 13 and one cell 12, but a person skilled in the art will know how to apply the method to several of these elements.

The system 1 also comprises a control module 30 that controls each of the elements of the system 1. More precisely, the module 30 manages the electrical supply of the apparatus 2 by controlling the activation/deactivation of each element and the routing of the electricity. For example, the module 30 checks whether the storage means 11 are charged or discharged.

For this reason, the module 30 is capable of knowing at any time the parameters of these elements (power provided by the source 10, power consumed by the apparatus 2, level of charge of the storage means 11, quantity of gaseous dihydrogen available, etc.), so as to implement the present method in the manner now to be described.

The control module 30 is typically an electronic card or a processor, advantageously connected to a communication network 3, as will be seen below.

Method

The present method begins with a step (a) of determining a power balance of the system 1, noted as $\Delta P(t)$, depending on the power consumed by the apparatus 2, noted as $P_C(t)$, and on the power provided by the intermittent electrical source 10, noted as $P_F(t)$.

These magnitudes are typically linked by the relation $\Delta P(t)=P_F(t)-P_C(t)$. Note that the power balance $\Delta P(t)$ can be completely negative, particularly if the power supplied is weak (for example in the case of a cloud passing, if the intermittent source 10 is a photovoltaic panel). In this case, this means that the system 1 brings the missing power to the operation of the apparatus 2 by discharging the storage means 11 and/or by operating the fuel cell 12.

In a step (b), the method involves the control module 30 receiving data representative of the stability of said power balance $\Delta P(t)$ during a safety period $t_{SEC}$. Depending on these data, the module 30, as will be seen later, will manage the components of the system 1 in an optimum manner so as to preserve their integrity.

In other words, the control module 30 acts as a module for pre-processing the data representative of the stability of said power balance.

In fact, where the prior art focused on the level of charge of the battery in order to control the system 1, and consequently ignored the electrochemical elements that are the fuel cell 12 and the unit 13, the present method principally uses the variation in the power balance as a reference magnitude. As will be seen, this enables equally optimal management of the energy while improving the lifetime of these electrochemical elements.

Data representative of the stability of said power balance $\Delta P(t)$ mean provisional data relating to the power $P_C(t)$ consumed by the apparatus 2 and/or the power $P_F(t)$ provided by the intermittent electrical source 10.

For example, if said data are representative of a subsequent decrease in the power provided $P_F(t)$, then the control module 30 can determine that the power balance $\Delta P(t)$ is not stable and will decrease.

Thus, said power balance during the safety period $t_{SEC}$ is advantageously determined as being:

Stable (i.e. substantially constant, meaning that $\Delta P(t_0) \approx \Delta P(t_0+t_{SEC})$), Downwardly unstable (i.e. $\Delta P(t_0) > \Delta P(t_0+t_{SEC})$), or Upwardly unstable (i.e. $\Delta P(t_0) < \Delta P(t_0+t_{SEC})$).

The "future" value (i.e. at the end of the safety period) of the power balance may be estimated, but this is not essential since only the evaluation of the stability is required.

Said safety period $t_{SEC}$ advantageously corresponds to a minimum recommended duration of continuous operation of the fuel cell 12 or of the electrochemical unit 13 in order to avoid damaging it, which is why it is called "safety." More precisely, it is a period before the expiry of which it is not desirable again to change the status (activate/deactivate) of the fuel cell 12 or the electrochemical unit 13 since this risks causing premature aging.

With respect to the existing technologies of these electrochemical elements, said safety period is typically between one and ten minutes.

These data representative of the stability of said power balance include, as explained generally, all of the information that can have an impact on the production of the source 10 and/or the consumption of the apparatus 2.

These data can be general data obtained locally, for example of meteorological origin, that can indicate to what extent the means of production of renewable energy will be productive, but preferably they cover more complex data provided by a communication network 3 (typically the internet), specifically via a box 31, particularly in real time.

As regards consumption, the forecast data can be data estimated by models, or simply data from the previous day, or even a plan of operation of the apparatus 2, if available.

In one embodiment, the box 31 is an apparatus with internet access provided by an internet access provider (for example, a 4G modem for autonomous operation), connected to the control module 30 by network connection means such as Wi-Fi, an Ethernet or USB connection, etc. The data may simply be pre-processed data on the servers of an electricity provider operating the system 1.

The present invention is neither limited to a particular type of data representative of the stability of said power balance, nor limited to a particular way of providing these data.

Control

In a step (c), the module 30 controls the fuel cell 12 and the electrochemical unit 13 (and the other elements of the system 1) depending on the power balance and its estimated stability, so as to supply the apparatus 2 in the optimum way.

In particular, the electrochemical unit 13 is activated if (and advantageously, only if) said power balance is greater than a first threshold and said data are not characteristic of a subsequent decrease in said power balance.

The first threshold substantially corresponds advantageously to the power necessary for the operation of the electrochemical unit 13 (i.e. the power of the electrochemical unit 13 as well as that of its auxiliaries), noted as $P_{H2}$.

In other words, the generation of hydrogen is only ordered if $\Delta P > P_{H2}$, i.e. $P_F > P_C + P_{H2}$, in other words, if the source 10 supplies sufficient power to supply both the apparatus 2 and the electrochemical unit 13 at the same time but in a sustainable way.

More precisely, even if the power is sufficient, if the provisional data show that it will not last longer than the safety period, then the electrochemical unit 13 is not activated. This avoids deactivating it a few minutes later and the damage associated with this switching off too short a time after its activation (before the end of the safety period).

In this case of non-activation due to instability, the surplus power (not used by the apparatus 2) is used if possible to charge the storage means 11 (and in the worst case scenario is lost, but since this cannot last longer than a few minutes, it is negligible).

As regards the fuel cell 12, it is activated if (and advantageously only if, with a possible single exception that will be described later) said power balance is less than a second threshold less than the first threshold and said data are not characteristic of a subsequent increase in said power balance.

The second threshold is advantageously substantially zero. In other words, the consumption of hydrogen is ordered only if $0 \geq \Delta P$ i.e. $P_F \leq P_C$, or, put another way, if the source 10 does not provide sufficient power to supply at least the apparatus 2, but in a sustainable manner.

More precisely, even if the power is insufficient, if the provisional data show that this will not last longer than the safety period (this means that the source 10 will provide a power sufficient to supply at least the apparatus 2 for a few minutes, and therefore that the consumption of hydrogen will no longer be necessary), then the fuel cell 12 is not activated. This avoids deactivating it a few minutes later and the damage associated with this switching off too short a time after its activation (before the end of the safety period).

During this lapse of time, the apparatus 2 discharges the storage means 11 in order to recover the remainder of power $P_C - P_F$. Since this situation should not last more than a few minutes, the charge of the battery is normally quite sufficient.

It should be noted that an emergency activation of the fuel cell 12 may still be envisaged even if said power balance is less than a second threshold less than the first threshold and said data are characteristic of a subsequent increase in said power balance; if a quantity of energy stored by the storage means 11 is insufficient to supply the apparatus 2 during said safety period.

This avoids a problematic situation in which the supply of the apparatus 2 would be suddenly interrupted, causing a problem of quality of service and potentially serious consequences if the apparatus 2 is critical (telecommunication apparatus, military apparatus, etc.).

More precisely, if Q is the charge of the battery and the system 1 (and if necessary apparatus 2) operates with a voltage U, emergency activation is performed if $Q*U < (P_C - P_F)*t_{SEC}$.

If the power balance is in the intermediate zone between the two thresholds (in other words, if the source 10 provides a power sufficient to supply the apparatus 2 but not apparatus 2 and the electrochemical unit 13 at the same time), i.e. $P_{H2} > \Delta P > 0$, i.e. $P_C + P_{H2} > P_F > P_C$, certain decisions are advantageously made by the control module 30 so as to again optimize the performance of the system 1 while again protecting the electrochemical elements 12 and 13.

In other words, with respect to the second threshold, the fuel cell 12 is preferably deactivated (in the event of a previously active state) if (and advantageously only if) said power balance is greater than the second threshold and said data are not characteristic of a subsequent decrease in said power balance—in other words, if the source 10 provides a power sufficient to supply at least the apparatus 2, but in a sustainable manner.

More precisely, although the power provided is at present sufficient so as no longer to require, in theory, the consumption of dihydrogen, if the provisional data show that this will not last longer than the safety period (which means that the power provided by the source 10 will again be insufficient to supply at least the apparatus 2 for a few minutes, and so the consumption of hydrogen will again be necessary), then the fuel cell 12 will not be deactivated, i.e. will remain activated. This avoids reactivating it a few minutes later and the damage associated with such switching on too short a time after its deactivation (before the end of the safety period).

Similarly, with respect to the first threshold, the electrochemical unit 13 is preferably deactivated (in the event of a previously active state) if (and advantageously only if, with a possible single exception that will be described later) said power balance is less than the first threshold and said data are not characteristic of a subsequent increase in said power balance—in other words, if the source 10 does not provide sufficient power to supply both the apparatus 2 and the electrochemical unit 13 at the same time but in a sustainable way.

More precisely, even if the total power is insufficient to continue to generate dihydrogen, if the provisional data show that this will not last longer than the safety period (this means that the source 10 will provide sufficient power to supply both the apparatus 2 and the electrochemical unit 13 at the same time for a few minutes, and therefore the production of hydrogen will again be possible), then the electrochemical unit 13 is not deactivated, i.e. remains activated. This avoids reactivating it a few minutes later and the damage associated with this switching on too short a time after its deactivation (before the end of the safety period).

During this lapse of time, the apparatus 2 uses the energy of the intermittent source 10 while the electrochemical unit 13 discharges the storage means 11 in order to recover the remainder of power $P_C + P_{H2} - P_F$. Since this situation should not last more than a few minutes, the charge of the battery is normally quite sufficient.

It should be noted that an emergency deactivation of the electrochemical unit 13 may be still envisaged even if said power balance is less than the first threshold and said data are characteristic of a subsequent increase in said power balance; if a quantity of energy stored by the electrical storage means 11 is insufficient to supply the electrochemical unit 13 during said safety period.

This avoids a problematic situation in which the supply of the electrochemical unit 13 would be suddenly interrupted, causing more significant damage than premature aging due to a deactivation and a closely occurring deactivation.

More precisely, if Q is the charge of the battery and the system 1 (and if necessary apparatus 2) operates with a voltage U, emergency activation is performed if $Q*U < (P_C + P_{H2} - P_F)*t_{SEC}$.

Note that in such a case, it could be envisaged that the subsequent reactivation of the electrochemical unit 13 could be delayed once the power balance $\Delta P$ increases beyond the first threshold.

Method

According to a second aspect, the invention relates to the system 1 implementing the method according to the first aspect of the invention.

This system 1 comprises an intermittent electrical source 10, electrical storage means 11, a fuel cell 12, an electrochemical unit for generating said fuel 13 and a control module 30 (and if necessary electrical or chemical auxiliaries).

The control module 30 is configured to implement:
- a module for determining a power balance of the system 1 depending on the power consumed by an apparatus 2 supplied by the system 1 and power provided by the intermittent electrical source 10;
- a module for receiving data representative of the stability of said power balance during a safety period;
- a module for activating the electrochemical unit 13 if said power balance is greater than a first threshold and said data are not characteristic of a subsequent decrease in said power balance;
- a module for activating the fuel cell 12 if said power balance is less than a second threshold less than the first threshold and said data are not characteristic of a subsequent increase in said power balance (and advantageously even if said power balance is less than a second threshold less than the first threshold and said data are characteristic of a subsequent increase in said power balance; if a quantity of energy stored by the electrical storage means 11 is insufficient to supply the apparatus 2 during said safety period).

Advantageously, the control module 30 also implements:
- a module for deactivating the fuel cell 12 if said power balance is greater than the second threshold and said data are not characteristic of a subsequent decrease in said power balance,
- a module for deactivating the electrochemical unit 13 if said power balance is less than the first threshold and said data are not characteristic of a subsequent increase in said power balance (and advantageously even if said power balance is less than the first threshold and said data are not characteristic of a subsequent increase in said power balance; if a quantity of energy stored by the electrical storage means 11 is insufficient to supply the apparatus 2 and the electrochemical unit 13 during said safety period).

The invention claimed is:

1. A method for supplying electricity to an apparatus (2) via a system (1) equipped with an intermittent electrical source (10), an electrical storage (11), a fuel cell (12), and an electrochemical unit (13) that generates fuel for said fuel cell (12), the electrical storage (11) storing electricity from the intermittent electrical source (10) and configured to release electricity to the apparatus (2) in order to smooth a variation in power supplied by the intermittent source (10), the method implemented by a control module (30) and comprising steps of automatically:
a) determining a power balance of the system (1) depending on power consumed by the apparatus (2) and the power supplied by the intermittent electrical source (10);
b) receiving data representative of a stability of said power balance during a safety period of between one and ten minutes;
c) comparing the power balance to at least one of a first threshold and a second threshold, determining whether said data are characteristic of at least one of a subsequent decrease in power balance at the end of the safety period and a subsequent increase in power balance at the end of the safety period, and based on results of said comparing and determining, controlling the fuel cell (12) and the electrochemical unit (13) as follows:
in a condition where said power balance is greater than a first threshold, and where said data are not characteristic of a subsequent decrease in said power balance at the end of the safety period, causing power to be provided to the electrochemical unit (13);
in a condition where the power balance is less than a second threshold less than the first threshold, and where said data are not characteristic of a subsequent increase in said power balance at the end of the safety period, activating the fuel cell (12) to supply power to the apparatus (2).

2. The method according to claim 1, wherein step (c) further comprises, in a condition where a quantity of energy stored by the electrical storage (11) is insufficient to supply the apparatus (2) during said safety period, controlling the fuel cell (12) to supply power to the apparatus via regardless of whether said power balance is less than the second threshold and said data are characteristic of the subsequent increase in said power balance.

3. The method according to claim 1, wherein step (c) further comprises, in a condition where said power balance is greater than the second threshold and said data are not characteristic of a subsequent decrease in said power balance, controlling the fuel cell (12) so as to deactivate the fuel cell (12).

4. The method according to claim 1, wherein step (c) further comprises, in a condition where said power balance is less than the first threshold and said data are not characteristic of a subsequent increase in said power balance, controlling the electrochemical unit (13) so as to deactivate the electrochemical unit (13).

5. The method according to claim 4, wherein step (c) further comprises, in a condition where a quantity of energy stored by the electrical storage (11) is insufficient to supply the apparatus (2) and the electrochemical unit (13) during said safety period, controlling the electrochemical unit (13) so as to deactivate the electrochemical unit (13), regardless of whether said power balance is less than the first threshold and said data are not characteristic of a subsequent increase in said power balance.

6. The method according to claim 1, wherein the electrochemical unit (13) consists of at least one electrolyzer.

7. The method according to claim 6, wherein the electrochemical unit (13) and the fuel cell (12) form a single reversible apparatus that produces fuel when supplied with current and produces current when provided with dihydrogen.

8. The method according to claim 1, wherein said fuel is dihydrogen.

9. The method according to claim 1, wherein the electrical storage (11) includes any of at least one battery, at least one supercapacitor, and at least one flywheel.

10. The method according to claim 1, wherein the first power balance threshold corresponds to a power required for the operation of the electrochemical unit (13), and the second power balance threshold is substantially zero.

11. A system (1), comprising:
an intermittent electrical source (10);
electrical storage (11) configured to store electricity from the intermittent electrical source (10) and to release electricity to the apparatus (2) in order to smooth a variation in power supplied by the intermittent source (10);

a fuel cell (12);

an electrochemical unit (13) that generates fuel for said fuel cell (12); and a control module (30), configured to operate as:
- a module that determines a power balance of the system (1), depending on power consumed by an apparatus (2) to which power is supplied by the system (1) and depending on power provided by the intermittent electrical source (10),
- a module that receives data representative of a stability of said power balance during a safety period, that compares the power balance to at least one of a first threshold and a second threshold and that determines whether said data are characteristic of at least one of a subsequent decrease in power balance at the end of the safety period and a subsequent increase in power balance at the end of the safety period, said safety period being between one and ten minutes,
- a module that, based on results of said comparing and determining, activates the electrochemical unit (13) when said power balance is greater than a first threshold and said data are not characteristic of a subsequent decrease in said power balance at the end of the safety period, and
- a module that, based on said results of said comparing and determining, activates the fuel cell (12) to supply power to the apparatus (2) when said power balance is less than a second threshold less than the first threshold and when said data are not characteristic of a subsequent increase in said power balance at the end of the safety period.

12. The method according to claim 2, wherein step (c) further comprises, in a condition where said power balance is greater than the second threshold and said data are not characteristic of a subsequent decrease in said power balance, controlling the fuel cell (12) so as to deactivate the fuel cell (12).

13. The method according to claim 2, wherein step (c) further comprises, in a condition where said power balance is less than the first threshold and said data are not characteristic of a subsequent increase in said power balance, controlling the electrochemical unit (13) so as to deactivate the electrochemical unit (13).

14. The method according to claim 3, wherein step (c) further comprises, in a condition where said power balance is less than the first threshold and said data are not characteristic of a subsequent increase in said power balance, controlling the electrochemical unit (13) so as to deactivate the electrochemical unit (13).

15. The method according to claim 12, wherein step (c) further comprises, in a condition where said power balance is less than the first threshold and said data are not characteristic of a subsequent increase in said power balance, controlling the electrochemical unit (13) so as to deactivate the electrochemical unit (13).

* * * * *